(12) United States Patent
Li (10) Patent No.: US 9,641,440 B2
(45) Date of Patent: May 2, 2017

(54) METHOD AND APPARATUS FOR MAINTAINING TOKEN

(71) Applicant: Huawei Technologies Co., Ltd., Shenzhen, Guangdong (CN)

(72) Inventor: Zhonghua Li, Shenzhen (CN)

(73) Assignee: Huawei Technologies Co., Ltd., Shenzhen (CN)

(\*) Notice: Subject to any disclaimer, the term of this patent is extended or adjusted under 35 U.S.C. 154(b) by 244 days.

(21) Appl. No.: 14/523,447

(22) Filed: Oct. 24, 2014

(65) Prior Publication Data

US 2015/0117214 A1 Apr. 30, 2015

(30) Foreign Application Priority Data

Oct. 25, 2013 (CN) .......................... 2013 1 0514262

(51) Int. Cl.
*H04L 12/819* (2013.01)
*H04L 12/26* (2006.01)
(Continued)

(52) U.S. Cl.
CPC ........ *H04L 47/215* (2013.01); *H04L 43/0894* (2013.01); *H04L 47/10* (2013.01);
(Continued)

(58) Field of Classification Search
CPC ... H04L 43/0894; H04L 47/10; H04L 47/215; H04L 47/2408; H04L 47/2458; H04L 47/31
See application file for complete search history.

(56) References Cited

U.S. PATENT DOCUMENTS 5,745,490 A \* 4/1998 Ghufran .............. H04L 12/5602 370/397
5,943,316 A \* 8/1999 Davis ...................... H04J 13/16 370/232

(Continued)

FOREIGN PATENT DOCUMENTS

CN 1949748 A 4/2007
CN 101778043 A 7/2010
(Continued)

OTHER PUBLICATIONS

Li et al., "Comparison Between Token Bucket Algorithms in QoS Technology," ZTE Communications, vol. 13, No. 3, ZTE Corporation, Shenzhen, China (Jun. 2007).

*Primary Examiner* — Asad Nawaz
*Assistant Examiner* — Kai Chang
(74) *Attorney, Agent, or Firm* — Leydig, Voit & Mayer, Ltd.

(57) ABSTRACT

Embodiments of the present invention disclose a method and an apparatus for maintaining tokens, and relate to the field of communications technologies, so as to solve a problem of a burst excess of data to be transmitted and improve QoS. The method of the present invention includes: obtaining a peak information rate (PIR) of a network node; splitting the PIR into a first rate and a second rate; obtaining, according to the first rate, the first number of added tokens corresponding to a first period, and obtaining, according to the second rate, the second number of added tokens corresponding to a second period; adding tokens according to the first period and the first number of added tokens, and adding tokens according to the second period and the second number of added tokens.

8 Claims, 8 Drawing Sheets

(51) Int. Cl.
*H04L 12/801* (2013.01)
*H04L 12/833* (2013.01)
*H04L 12/851* (2013.01)

(52) U.S. Cl.
CPC ...... *H04L 47/2408* (2013.01); *H04L 47/2458* (2013.01); *H04L 47/31* (2013.01)

(56) References Cited

U.S. PATENT DOCUMENTS

| | | | | |
|---|---|---|---|---|
| 6,801,500 | B1* | 10/2004 | Chandran | H04L 12/5602 370/230.1 |
| 7,602,721 | B1* | 10/2009 | Tangirala | H04L 47/10 370/235.1 |
| 7,830,796 | B2* | 11/2010 | Chen | H04L 47/10 370/230 |
| 7,908,390 | B2* | 3/2011 | Takase | H04L 47/10 709/223 |
| 2005/0078602 | A1 | 4/2005 | Mancour et al. | |
| 2006/0194601 | A1* | 8/2006 | Nandagopalan | H04L 12/5695 455/515 |
| 2010/0208665 | A1* | 8/2010 | Vivanco | H04L 1/0025 370/329 |
| 2011/0096674 | A1* | 4/2011 | Dong | H04L 47/10 370/252 |
| 2011/0320631 | A1* | 12/2011 | Finkelstein | H04L 41/0896 709/232 |
| 2012/0030319 | A1* | 2/2012 | Andries | H04L 41/5009 709/220 |
| 2012/0051218 | A1* | 3/2012 | Mohandoss | H04L 47/2425 370/232 |
| 2013/0286842 | A1* | 10/2013 | Nakatsugawa | H04L 47/125 370/235 |
| 2014/0112148 | A1* | 4/2014 | Flinta | H04L 43/087 370/235.1 |

FOREIGN PATENT DOCUMENTS

| | | |
|---|---|---|
| CN | 102164083 A | 8/2011 |
| CN | 103248580 A | 8/2013 |

* cited by examiner

METHOD AND APPARATUS FOR MAINTAINING TOKEN

CROSS-REFERENCE TO RELATED APPLICATION

This application claims priority to Chinese Patent Application No. 201310514262.5, filed on Oct. 25, 2013, which is hereby incorporated by reference in its entirety.

TECHNICAL FIELD

The present invention relates to the field of communications technologies, and in particular, to a method and an apparatus for maintaining tokens.

BACKGROUND

A differentiated services model is a most widely-applied IP QoS (IP Quality of Service, IP quality of service) model at present. In a process in which a network node that uses a differentiated services model sends data, it needs to use tokens to regulate a data sending rate. Furthermore, a token bucket is disposed in the network node and token are stored in the token bucket. The network node needs to consume a certain number of tokens each time sending a certain amount of data. A capacity of the token bucket is preset. Therefore, after the tokens are consumed, tokens need to be periodically added to the token bucket. For example, a storage capacity occupied by tokens added in each period is:

$$PIR*T=Token$$

A PIR (Peak Information Rate, peak information rate) is a data transmission rate of the network node; T is an adding period of the token; Token is a storage capacity occupied by tokens added each time. In addition, in a process of maintaining tokens, the network node needs to record a storage capacity occupied by tokens added to the token bucket in one period, so as to enable the network node to determine whether all tokens currently stored in the token bucket can support data sending.

To achieve better QoS and control a data sending rate, a short period is generally selected as far as possible to add tokens, for example, a minimum period that can be supported by hardware performance is selected. However, selecting a short period easily causes a decimal part in a Token value, and when the decimal part of the Token value is stored, more storage resources need to be occupied. To avoid existence of a decimal part, a longer period is selected to add a token in the prior art, which enables a Token value in one period to be an integer when a PIR is minimal.

However, a longer period is selected in the prior art, when a PIR is extremely large, a Token value of a token added in one period is too large, which easily causes a burst excess of data that needs to be transmitted, so that a traffic peak occurs and QoS is reduced.

SUMMARY

Embodiments of the present invention provide a method and an apparatus for maintaining tokens, which can solve a problem of a burst excess and improve QoS.

To achieve the foregoing objectives, the following technical solutions are adopted in the embodiments of the present invention:

According to a first aspect, an embodiment of the present invention provides a method for maintaining tokens, and the method includes:

obtaining a peak information rate (PIR) of a network node;

splitting the PIR into a first rate and a second rate, where a sum of the first rate and the second rate are equal to the PIR;

obtaining, according to the first rate, the first number of added tokens corresponding to a first period, and obtaining, according to the second rate, the second number of added tokens corresponding to a second period; and adding tokens according to the first period and the first number of added tokens, and adding tokens according to the second period and the second number of added tokens.

With reference to the first aspect, in a first possible implementation manner, the method further includes:

obtaining a minimum refresh period that hardware performance of the network node can support; and setting a value that is greater than or equal to the minimum refresh period to the first period.

Optionally, the splitting the PIR into a first rate and a second rate includes:

obtaining L and K and obtaining N, where $N=L/(K*T_1)$, L represents a minimum packet length, K represents precision of the PIR, and $T_1$ represents the first period;

obtaining W by using N, where $N=2^W$, or $2^W$ is a minimum integer that is greater than N;

determining binary numbers of a bit 0 to a bit M of the PIR, and obtaining binary numbers of a $W^{th}$ bit to an $M^{th}$ bit; and obtaining the first rate according to the binary numbers of the $W^{th}$ bit to the $M^{th}$ bit.

Further, the splitting the PIR into a first rate and a second rate further includes:

obtaining, from the binary numbers of the bit 0 to the bit M of the PIR, binary numbers of a $W'^{th}$ bit to a $(W-1)^{th}$ bit, where $0 \le W' < W$; and obtaining the second rate according to the binary numbers of the $W'^{th}$ bit to the $(W-1)^{th}$ bit.

With reference to the first aspect and the first possible implementation manner of the first aspect, in a second possible implementation manner, the method further includes:

obtaining $Token_{max}$, where $Token_{max}=PIR*T_{max}$, $T_{max}$ represents a period corresponding to the PIR, and $T_{max} \ge L/K$;

obtaining a token difference, where the token difference=$Token_{max}-V_1*T_1*[T_{max}/T_1]$, and $V_1$ represents the first rate; and obtaining the second period by using the token difference and the second rate.

According to a second aspect, an embodiment of the present invention provides an apparatus for maintaining tokens, and the apparatus includes:

a first obtaining module, configured to obtain a peak information rate (PIR) of a network node;

a splitting module, configured to split the PIR into a first rate and a second rate, where a sum of the first rate and the second rate are equal to the PIR;

a second obtaining module, configured to obtain, according to the first rate, the first number of added tokens corresponding to a first period, and obtain, according to the second rate, the second number of added tokens corresponding to a second period; and an adding module, configured to add tokens according to the first period and the first number of added tokens, and add tokens according to the second period and the second number of added tokens.

With reference to the second aspect, in a first possible implementation manner, the apparatus further includes:

a third obtaining module, configured to obtain a minimum refresh period that hardware performance of the network node can support; and a first period obtaining module, configured to set a value that is greater than or equal to the minimum refresh period to the first period.

Optionally, the splitting module includes:

a first obtaining unit, configured to obtain L and K and obtain N, where $N=L/(K*T_1)$, L represents a minimum packet length, K represents precision of the PIR, and $T_1$ represents the first period;

a second obtaining unit, configured to obtain W by using N, where $N=2^W$, or $2^W$ is a minimum integer that is greater than N;

a third obtaining unit, configured to determine binary numbers of a bit 0 to a bit M of the PIR, and obtain binary numbers of a $W^{th}$ bit to an $M^{th}$ bit; and a first rate obtaining unit, configured to obtain the first rate according to the binary numbers of the $W^{th}$ bit to the $M^{th}$ bit.

Further, the splitting module further includes:

a fourth obtaining unit, configured to obtain, from the binary numbers of the bit 0 to the bit M of the PIR, binary numbers of a $W'^{th}$ bit to a $(W-1)^{th}$ bit, where $0 \le W' < W$; and a second rate obtaining unit, configured to obtain the second rate according to the binary numbers of the $W'^{th}$ bit to the $(W-1)^{th}$ bit.

With reference to the second aspect and the first possible implementation manner of the second aspect, in a second possible implementation manner, the apparatus further includes:

a fourth obtaining module, configured to obtain $Token_{max}$, where $Token_{max}=PIR*T_{max}$, $T_{max}$ represents a period corresponding to the PIR, and $T_{max} \ge L/K$;

a fifth obtaining module, configured to obtain a token difference, where the token difference=$Token_{max}-V_1*T_1*[T_{max}/T_1]$, and $V_1$ represents the first rate; and a second period obtaining module, configured to obtain the second period by using the token difference and the second rate.

According to the method and the apparatus for maintaining tokens provided by the embodiments of the present invention, a peak information rate (PIR) of a network node can be obtained; the PIR is split into a first rate and a second rate; then the first number of added tokens corresponding to a first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in the solutions provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
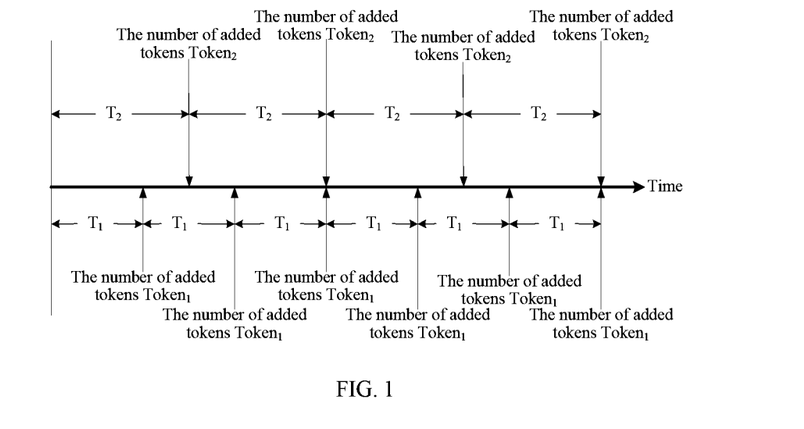
FIG. 1 is a schematic diagram of an example for adding tokens according to an embodiment of the present invention.

Technical solutions provided by the embodiments of the present invention may be applied to a scenario in which tokens are added when a token bucket is used to limit the amount of data sent by a network node. For example, a computer, as one network node in a local area network, can use tokens to limit sending rates of various data in the local area network. In the solutions, a peak information rate (PIR) of a network node is obtained; the PIR is split into a first rate and a second rate, or the PIR may be split into more rates, such as a third rate and a fourth rate; then the number of added tokens corresponding to each period is obtained according to each rate; and tokens are added according to each period and the number of the added tokens corresponding to each period. For example, as shown in FIG. 1, in a long period, the first number of tokens added according to a first period $T_1$ is Tokens, where $Token_1=V_1*T_1$ and $V_1$ is a first rate; and the second number of tokens added according to a second period $T_2$ is $Token_2$, where $Token_2=V_2*T_2$ and $V_2$ is a second rate.

Figure 2:
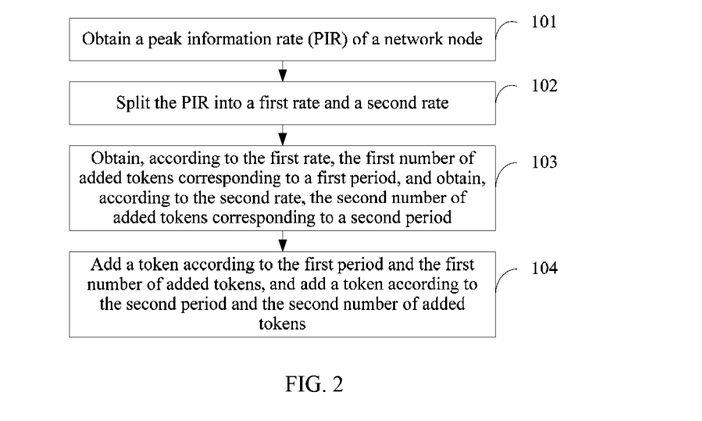
FIG. 2 is a flowchart of a method for maintaining tokens according to an embodiment of the present invention.

An embodiment of the present invention provides a method for maintaining tokens. As shown in FIG. 2, the method includes the following steps:

101: Obtain a peak information rate (PIR) of a network node.

The PIR may be represented as n*precision of the PIR, where n is a positive integer, and the precision of the PIR may be learnt when the PIR of the network node is obtained.

102: Split the PIR into a first rate and a second rate.

A sum of the first rate and the second rate are equal to the PIR. In a practical application, the PIR may be represented as n*the precision of the PIR, where n may be represented by using a binary number, and the PIR may be split into the first rate and the second rate by calculating and according to n represented by using the binary number. The first rate may be represented by $V_1$ and the second rate may be represented by $V_2$, or the PIR may be split into more rates, for example, the PIR is split into a first rate, a second rate, a third rate, and a fourth rate, and a sum of the first rate, the second rate, the third rate, and the fourth rate are equal to the PIR.

103: Obtain, according to the first rate, the first number of added tokens corresponding to a first period, and obtain, according to the second rate, the second number of added tokens corresponding to a second period.

The first number of added tokens may be represented by $Token_1$, and $Token_1 = V_1 * T_1$, where $V_1$ is the first rate, and $T_1$ is the first period; and the second number of added tokens may be represented by $Token_2$, and $Token_2 = V_2 * T_2$, where $V_2$ is the second rate, and $T_2$ is the second period.

104: Add tokens according to the first period and the first number of added tokens, and add tokens according to the second period and the second number of added tokens.

The first period corresponds to the first number of added tokens, and the second period corresponds to the second number of added tokens, where both the first number of added tokens and the second number of added tokens are integers. Therefore, the number of added tokens does not have a decimal part that occupies a storage resource.

According to the method for maintaining tokens provided by this embodiment of the present invention, a peak information rate (PIR) of a network node can be obtained; the PIR is split into a first rate and a second rate; then the first number of added tokens corresponding to a first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 3:
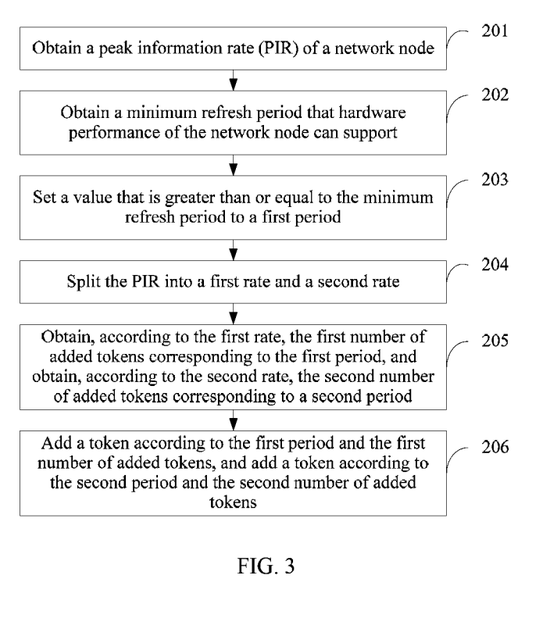
FIG. 3 is a flowchart of another method for maintaining tokens according to an embodiment of the present invention.

Optionally, based on the method shown in FIG. 2, an embodiment of the present invention further provides a method for maintaining tokens, specifically, a first period can be obtained by performing steps 202 to 203 and according to a minimum refresh period that hardware performance of a network node can support. As shown in FIG. 3 the method includes the following steps:

201: Obtain a peak information rate (PIR) of a network node.

A specific implementation manner of 201 is the same as that of 101, and details are not described herein again.

202: Obtain a minimum refresh period that hardware performance of the network node can support.

The minimum refresh period that the hardware performance of the network node can support is a minimum period that can be selected for adding tokens under a condition that the hardware performance of the network node can support.

203: Set a value that is greater than or equal to the minimum refresh period to the first period.

204: Split the PIR into a first rate and a second rate.

A specific implementation manner of 204 is the same as that of 102, and details are not described herein again.

205: Obtain, according to the first rate, the first number of added tokens corresponding to the first period, and obtain, according to the second rate, the second number of added tokens corresponding to a second period.

A specific implementation manner of 205 is the same as that of 103, and details are not described herein again.

206: Add tokens according to the first period and the first number of added tokens, and add tokens according to the second period and the second number of added tokens.

A specific implementation manner of 206 is the same as that of 104, and details are not described herein again.

According to the method for maintaining tokens provided by this embodiment of the present invention, a peak information rate (PIR) of a network node can be obtained; the PIR is split into a first rate and a second rate; a first period can further be selected according to a minimum refresh period that hardware performance of the network node can support; then the first number of added tokens corresponding to the first period is obtained according to the first rate, and the second number of added tokens corresponding to a second period is obtained according to the second rate; and tokens are added according to the first period and the first number of added tokens, and tokens are added according to the second period and the second number added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 4:
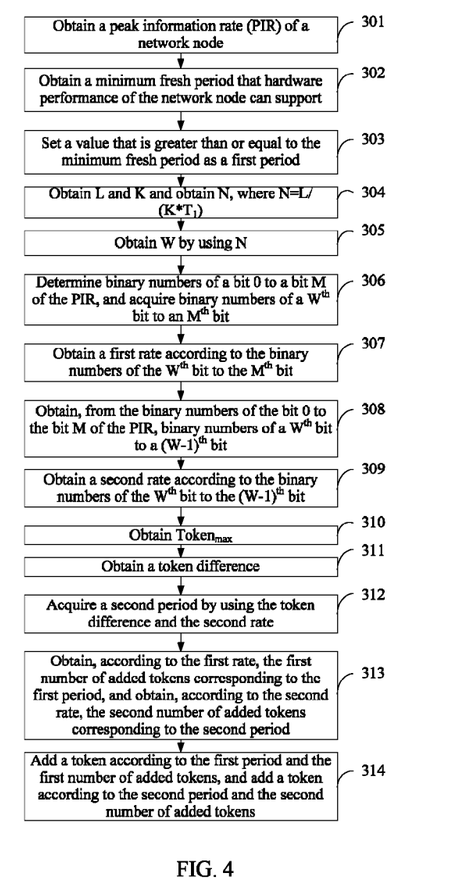
FIG. 4 is a flowchart of still another method for maintaining tokens according to an embodiment of the present invention.

Further, based on the method shown in FIG. 3, an embodiment of the present invention further provides a method for maintaining tokens. 204 may be specifically implemented by performing 304 to 309, and a PIR is split into a first rate and a second rate; and a second period corresponding to the second rate is determined by performing 310 to 312. As shown in FIG. 4, the method includes the following steps:

301: Obtain a peak information rate (PIR) of a network node.

302: Obtain a minimum refresh period that hardware performance of the network node can support.

303: Set a value that is greater than or equal to the minimum refresh period to a first period.

304: Obtain L and K and obtain N, where $N = L/(K*T_1)$.

L represents a minimum packet length, K represents precision of the PIR, and $T_1$ represents the first period. For example, the minimum packet length is 1 byte, that is 8 bits, the precision K of the PIR is 16 kbps, the first period $T_1$ is 15.625 μs, and then N=8 bit/(16 kbps*15.625 μs)=32. For another example, the minimum packet length is 1 byte, that is 8 bits, the precision K of the PIR is 16 kbps, the first period $T_1$ is 15.625 μs, and then N=8 bit/(16 kbps*16 μs)=31.25.

305: Obtain W by using N.

$N=2^W$, or $2^W$ is a minimum integer that is greater than N. For example, N=32 is obtained in the example in 304, and then $2^W$=32, and W=5. For another example, N=31.25 is obtained in the example in 304, and then $2^w$ is a minimum integer that is greater than 31.25, $2^W$=32, and W=5.

306: Determine binary numbers of a bit 0 to a bit M of the PIR, and obtain binary numbers of a $W^{th}$ bit to an $M^{th}$ bit.

In a practical application, the PIR may be represented as n*the precision of the PIR, where n is a positive integer, n may be represented as the binary numbers of the bit 0 to the bit M, the bit 0 is the least significant bit and the bit M is the most significant bit. For example, PIR=108223*16 kpbs, and then n is 108223, where n is represented as 11010011010111111 by using binary numbers, the least significant bit 0 in the binary numbers of n is 1, and the most significant bit 16 is 1; and assuming W=5, binary numbers of a $5^{th}$ bit to a $16^{th}$ bit are obtained.

307: Obtain the first rate according to the binary numbers of the $W^{th}$ bit to the $M^{th}$ bit.

The $W^{th}$ bit to the $M^{th}$ bit of the binary numbers n of the PIR are reserved, an $(M-1)^{th}$ bit to the bit 0 are set to 0, $n_1$ is obtained, and the first rate $V_1=n_1$*the precision of the PIR. For example, the $5^{th}$ bit to the $16^{th}$ bit of the binary numbers n of the PIR are obtained in the example in 306, and a $4^{th}$ bit to the bit 0 are set to 0, obtained $n_1$ is represented as 11010011010100000 by using binary numbers, that is, $n_1$=108192, and then the first rate $V_1$=108192*16 kpbs is obtained.

308: Obtain, from the binary numbers of the bit 0 to the bit M of the PIR, binary numbers of a $W'^{th}$ bit to a $(W-1)^{th}$ bit.

0≤W'<W. The $W^{th}$ bit to the $M^{th}$ bit of the binary numbers n of the PIR are set to 0, the $W^{th}$ bit to the $(W-1)^{th}$ bit of the binary numbers n of the PIR are reserved, the $(W-1)^{th}$ bit to the bit 0 are set to 0, and $n_2$ is obtained; if W-1<0, it indicates that the PIR is split into only two rates. For example, in the example in 306, binary numbers of the bit 0 to the bit 4 of the PIR are 11111, and assuming W'=0 and W'-1<0, the PIR is split into only two rates, and obtained $n_2$ is represented as 11111 by using binary numbers.

309: Obtain the second rate according to the binary numbers of the $W^{th}$ bit to the $(W-1)^{th}$ bit.

According to 308, the second rate $V_2=n_2$*PIR. For example, in the example in 308, the PIR is split into only two rates, the obtained $n_2$ is represented as 11111 by using the binary numbers, that is, $n_2$=31, and the second rate $V_2$=31*16 kpbs.

The PIR may not only be split into two rates, but may also be split into more rates, such as a third rate and a fourth rate. By analogy, a calculation method of such rates as the third rate and the fourth rate is similar to a calculation method of the second rate. For example, in the example in 308, it may also be assumed that W'=1, and the $1^{th}$ bit to the $4^{th}$ bit of the binary numbers n of the PIR are reserved, the bit 0 is set to 0, the obtained $n_2$ is represented as 11110 by using the binary numbers, that is, $n_2$=30, and then the second rate $V_2$=30*16 kpbs; and the bit 0 of the binary numbers n of the PIR is reserved, obtained $n_3$ is represented as 1 by using a binary number, that is, $n_3$=1, and then the third rate $V_3$=1*16 kpbs.

310: Obtain $Token_{max}$, where $Token_{max}$=PIR*$T_{max}$.

$Token_{max}$ represents a total number of tokens added in $T_{max}$, and $T_{max}$ represents a period corresponding to the PIR, where $T_{max}$≥L/K. The PIR may be represented as n*the precision of the PIR and n is a positive integer, so that it can be ensured that the added $Token_{max}$ in the period $T_{max}$ is an integer multiple of the minimum packet length. Therefore, the $Token_{max}$ added in the period $T_{max}$ does not have a decimal part, and does not occupy an extra storage resource. For example, the PIR is 108223*16 kpbs, the minimum packet length L is 1 byte, that is, 8 bits, the precision K of the PIR is 16 kbps, $T_{max}$≥8 bit/16 kbps=500 μs, and assuming $T_{max}$=500 μs, the $Token_{max}$ added in the period $T_{max}$=PIR*$T_{max}$108223*16 kpbs*500 μs=108223 byte. For another example, the PIR is 108223*16 kpbs, the minimum packet length L is 1 byte, that is, 8 bits, the precision K of the PIR is 16 kbps, $T_{max}$≥8 bit/16 kbps=500 μs, and assuming $T_{max}$=1000 μs, the $Token_{max}$ added in the period $T_{max}$=PIR*$T_{max}$108223*16 kpbs*1000 μs=216446 byte.

311: Obtain a token difference, where the token difference=$Token_{max}-V_1*T_1*[T_{max}/T_1]$.

$V_1$ represents the first rate, and $[T_{max}/T_1]$ represents an integer part of a value obtained by calculating $T_{max}/T_1$, that is, times of adding tokens by using $T_1$ as a period in $T_{max}$. For example, PIR=108223*16 kpbs, the minimum packet length L is 1 byte, that is, 8 bits, $T_{max}$=500 μs, and then the $Token_{max}$ added in the period $T_{max}$=PIR*$T_{max}$=108223*16 kpbs*500 μs=108223 byte. The first period $T_1$ is 15.625 μs, calculation is performed according to 304 to 307, the first rate $V_1$=108192*16 kpbs is obtained, and then the token difference=$Token_{max}-V_1*T_3*[T_{max}/T_1]$=31 byte may be obtained.

312: Obtain the second period by using the token difference and the second rate.

For example, in the example in 311, it is assumed that the PIR is split into two rates, and the second rate $V_2$=31*16 kpbs. Because the token difference is 31 byte, which may be added once in $T_{max}$, and then $T_2$=31 byte/1/(31*16 kpbs) =500 μs, where 1 represents that tokens are added once by using $T_2$ as a period in $T_{max}$. The PIR is split into more rates, and a period corresponding to each rate may also be obtained. For example, in the example in 309, the PIR is split into three rates, PIR=108223*16 kpbs, the minimum packet length L is 1 byte, that is, 8 bits, $T_{max}$=500 μs, and then the $Token_{max}$ added in the period $T_{max}$=PIR*$T_{max}$=108223*16 kpbs*500 μs=108223 byte. The first period T1 is 15.625 μs, calculation is performed according to 304 to 307 and the first rate V1=108192*16 kpbs is obtained, and then the token difference=$Token_{max}-V_1*T_1*[T_{max}/T_1]$=31 byte, the second rate $V_2$=30*16 kpbs, and the third rate $V_3$=1*16 kpbs may be obtained. The token difference 31 byte is divided into 30 byte and 1 byte, and it is considered that 30 byte is added twice and 1 byte is added once in $T_{max}$, and then the second period $T_{2=30}$ byte/2/(30*16 kpbs)=250 μs, the third period $T_3$=1 byte/1/(1*16 kpbs)=500 μs.

313: Obtain, according to the first rate, the first number of added tokens corresponding to the first period, and obtain, according to the second rate, the second number of added tokens corresponding to the second period.

If the PIR is split into more rates, such as the third rate and the fourth rate, the number of added tokens corresponding to each period may also be obtained according to each rate. For example, the third number of added tokens corresponding to a third period is obtained according to the third rate and the fourth number of added tokens corresponding to a fourth period is obtained according to the fourth rate.

Further, in a case in which the PIR is determined, the first period and the second period may also be set in advance; or after the first rate and the second rate are obtained, the first period and the second period corresponding to the first rate and the second rate may be searched for according to a table that records a mapping between a rate and a period, so as to obtain a proper first period and second period.

Further, the network node can plan a token maintenance unit according to a QoS requirement. Because Token=PIR*T, where T is a token adding period, Token is the number of added tokens corresponding to an adding period, tokens added in each period may be represented in the form of n'*m', n' is a positive integer and m' is the token maintenance unit, m' may be less than a bit, such as 0.25 bit, and m' may also be greater than a byte, such as 16 byte. For example, the tokens added in each period are 3376 byte, and the token maintenance unit m'=16 byte is planned according to the QoS requirement, and then the Token may be written as 211*16 byte. For another example, the tokens added in each period are 4 byte, and the token maintenance unit m'=0.25 bit is planned according to the QoS requirement, and then the Token may be written as 128*0.25 bit.

314: Add tokens according to the first period and the first number of added tokens, and add tokens according to the second period and the second number of added tokens.

If the PIR is split into more rates, such as the third rate and the fourth rate, then tokens are added according to each period corresponding to each split rate and the number of added tokens corresponding to each period. For example, tokens are added according to the third period and the third number of added tokens and tokens are added according to the fourth period and the fourth number of added tokens.

According to the method for maintaining tokens provided by this embodiment of the present invention, a peak information rate (PIR) of a network node can be obtained; a first period is set according to a minimum refresh period that hardware performance of the network node can support; the PIR is split into a first rate and a second rate; a second period is obtained according to $Token_{max}$ and the second rate; then the first number of added tokens corresponding to the first period is obtained according to the first rate, and the second number of added tokens corresponding to the second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS; meanwhile, because a minimum PIR=1*precision of the PIR, $Token_{max}$ added in a period $T_{max}$ does not have a decimal part, and a storage resource occupied by an occupied storage capacity for storing an added token is reduced.

Figure 5:
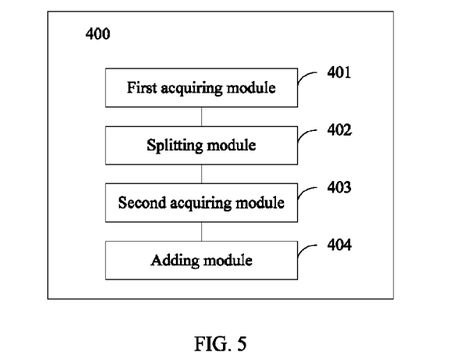
FIG. 5 is a schematic structural diagram of an apparatus for maintaining tokens according to an embodiment of the present invention.

An embodiment of the present invention further provides an apparatus 400 for maintaining tokens. As shown in FIG. 5, the apparatus includes:

a first obtaining module 401, configured to obtain a peak information rate (PIR) of a network node;

a splitting module 402, configured to split the PIR into a first rate and a second rate, where a sum of the first rate and the second rate are equal to the PIR;

a second obtaining module 403, configured to obtain, according to the first rate, the first number of added tokens corresponding to a first period, and obtain, according to the second rate, the second number of added tokens corresponding to a second period; and an adding module 404, configured to add tokens according to the first period and the first number of added tokens and add tokens according to the second period and the second number of added tokens.

According to the apparatus for maintaining tokens provided by this embodiment of the present invention, a peak information rate (PIR) of a network node can be obtained; the PIR is split into a first rate and a second rate; then the first number of added tokens corresponding to a first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 6:
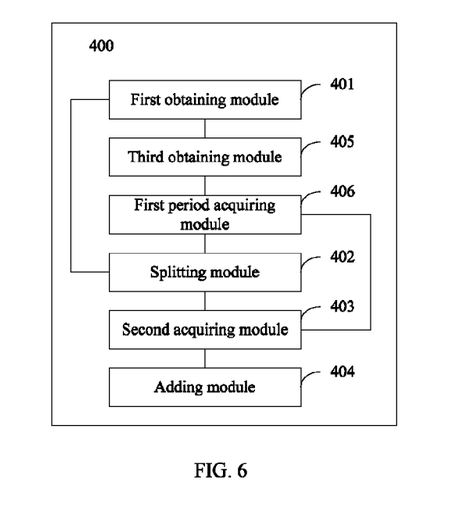
FIG. 6 is a schematic structural diagram of another apparatus for maintaining tokens according to an embodiment of the present invention.

Optionally, as shown in FIG. 6, the apparatus 400 may further include:

a third obtaining module 405, configured to obtain a minimum refresh period that hardware performance of the network node can support; and a first period obtaining module 406, configured to set a value that is greater than or equal to the minimum refresh period to the first period.

According to the apparatus for maintaining tokens provided by this embodiment of the present invention, a peak information rate (PIR) of a network node can be obtained; the PIR is split into a first rate and a second rate; a first period can further be selected according to a minimum refresh period that hardware performance of the network node can support; then the first number of added tokens corresponding to the first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 7:
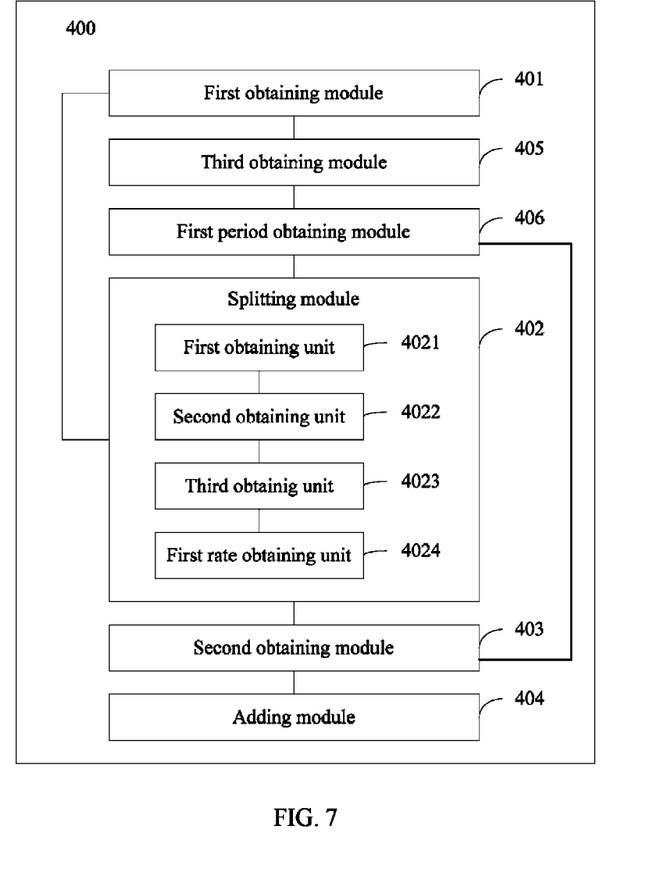
FIG. 7 is a schematic structural diagram of a specific implementation manner of another apparatus for maintaining tokens according to an embodiment of the present invention.

Optionally, as shown in FIG. 7, the splitting module 402 may include:

a first obtaining unit 4021, configured to obtain L and K and obtain N, where $N=L/(K*T_1)$, where L represents a minimum packet length, K represents precision of the PIR, and $T_1$ represents the first period;

a second obtaining unit 4022, configured to obtain W by using N, where $N=2^W$, or $2^W$ is a minimum integer that is greater than N;

a third obtaining unit 4023, configured to determine binary numbers of a bit 0 to a bit M of the PIR, and obtain binary numbers of a $W^{th}$ bit to an $M^{th}$ bit; and a first rate obtaining unit 4024, configured to obtain the first rate according to the binary numbers of the $W^{th}$ bit to the $M^{th}$ bit.

According to the apparatus for maintaining tokens provided by this embodiment of the present invention, a peak information rate (PIR) of a network node can be obtained; a first period is selected according to a minimum refresh period that hardware performance of the network node can support; the PIR is split into a first rate and a second rate; then the first number of added tokens corresponding to the first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 8:
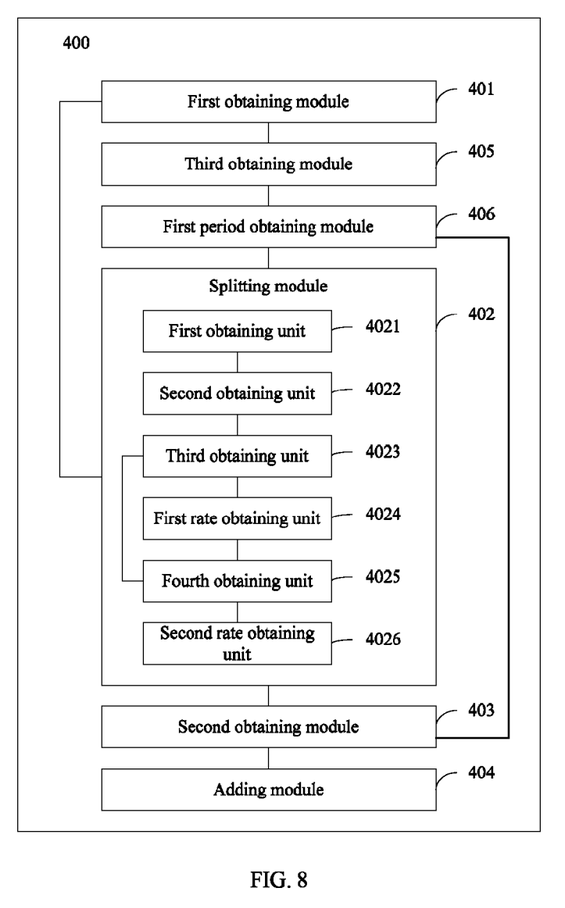
FIG. 8 is a schematic structural diagram of another specific implementation manner of another apparatus for maintaining tokens according to an embodiment of the present invention.

Optionally, as shown in FIG. 8, the splitting module 402 may further include:

a fourth obtaining unit 4025, configured to obtain, from the binary numbers of the bit 0 to the bit M of the PIR, binary numbers of a $W^{th}$ bit to a $(W-1)^{th}$ bit, where $0 \le W' < W$; and a second rate obtaining unit 4026, configured to obtain the second rate according to the binary numbers of the $W^{th}$ bit to the $(W-1)^{th}$ bit.

According to the apparatus for maintaining tokens provided by this embodiment of the present invention, a peak information rate (PIR) of a network node can be obtained; a first period is selected according to a minimum refresh period that hardware performance of the network node can support; the PIR is split into a first rate and a second rate; then the first number of added tokens corresponding to the first period is obtained according to the first rate, and the second number of added tokens corresponding to a second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS.

Figure 9:
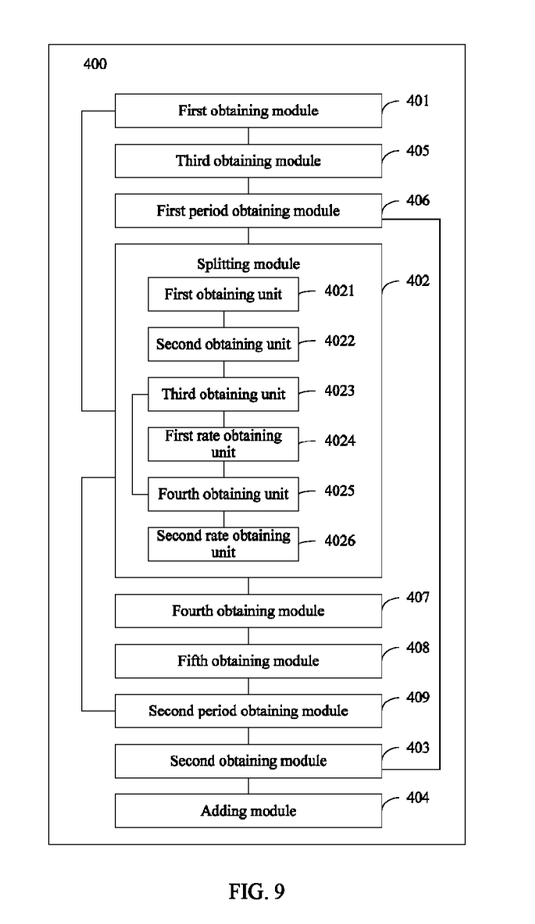
FIG. 9 is a schematic structural diagram of still another specific implementation manner of another apparatus for maintaining tokens according to an embodiment of the present invention.

Optionally, as shown in FIG. 9, the apparatus 400 may further include:

a fourth obtaining module 407, configured to obtain $Token_{max}$, where $Token_{max}=PIR*T_{max}$, $T_{max}$ represents a period corresponding to the PIR, and $T_{max} \ge L/K$;

a fifth obtaining module 408, configured to obtain a token difference, where the token difference=$Token_{max}-V_1*T_1*[T_{max}/T_1]$, where $V_1$ represents the first rate; and a second period obtaining module 409, configured to obtain the second period by using the token difference and the second rate.

According to the apparatus for maintaining tokens provided by this embodiment of the present invention, a peak information rate (PIR) of a network node can be obtained; a first period is set according to a minimum refresh period that hardware performance of the network node can support; the PIR is split into a first rate and a second rate; a second period is obtained according to $Token_{max}$ and the second rate; then the first number of added tokens corresponding to the first period is obtained according to the first rate, and the second number of added tokens corresponding to the second period is obtained according to the second rate; and token are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS; meanwhile, because a minimum PIR=1*precision of the PIR, $Token_{max}$ added in a period $T_{max}$ does not have a decimal part, and a storage resource occupied by an occupied storage capacity for storing an added token is reduced.

Figure 10:
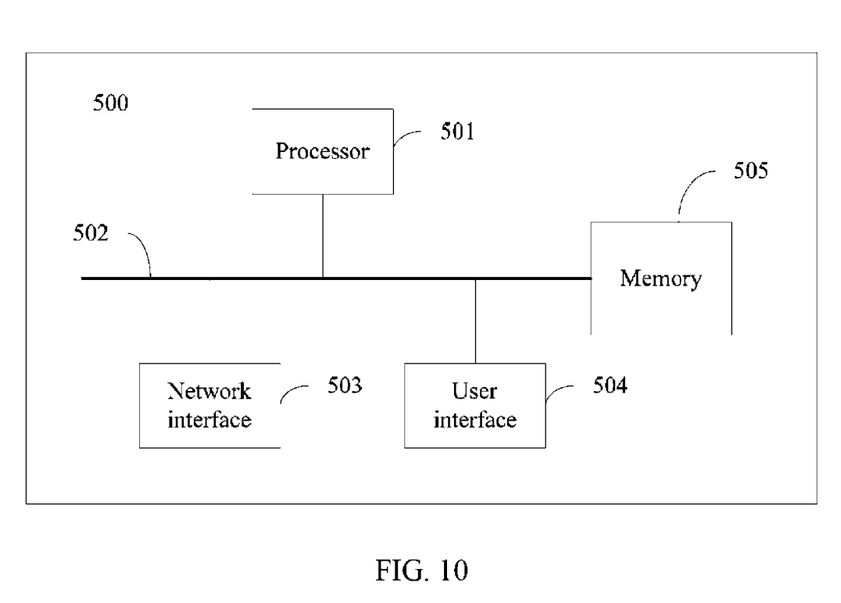
FIG. 10 is a schematic structural diagram of still another apparatus for maintaining tokens according to an embodiment of the present invention.

An embodiment of the present invention further provides an apparatus 500 for maintaining tokens. As shown in FIG. 10, the apparatus includes: at least one processor 501, such as a CPU; at least one communications bus 502; at least one network interface 503 and/or at least one user interface 504; and a memory 505. The communications bus 502 is configured to implement connection and communication between these components. The network interface 503 may be used to transmit data. The user interface 504 may include devices such as a display, a keyboard, and a mouse. The memory 505 may include a high-speed RAM memory, and may further include a non-volatile memory (non-volatile memory), for example, at least one disk memory. The memory 505 may be configured to store the obtained peak information rate (PIR) of a network node, minimum packet length, and precision of the PIR; may also be configured to store various parameters that are generated in a process in which the processor processes data; may further be configured to store multiple rates that are obtained by splitting the PIR, and each period corresponding to each rate; and may further configured to store the number of added tokens corresponding to each period.

Specifically, the processor 501 is configured to obtain a peak information rate (PIR) of a network node; configured to split the PIR into a first rate and a second rate, where a sum of the first rate and a second arte are equal to the PIR; configured to obtain, according to the first rate, the first number of added tokens corresponding to a first period, and obtain, according to the second rate, the second number of added tokens corresponding to a second period; and configured to add tokens according to the first period and the first number of added tokens, and add tokens according to the second period and the second number of added tokens.

Optionally, the processor 501 is further configured to obtain a minimum refresh period that hardware performance of the network node can support and configure to set a value that is greater than or equal to the minimum refresh period to the first period.

Further, the processor 501 is further configured to obtain L and K and obtain N, where $N=L/(K*T_1)$, L represents a minimum packet length, K represents precision of the PIR, and $T_1$ represents the first period; obtain W by using N, where $N=2^W$, or $2^W$ is a minimum integer that is greater than N; determine binary numbers of a bit 0 to a bit M of the PIR, and obtain binary numbers of a $W^{th}$ bit to an $M^{th}$ bit; and obtain the first rate according to the binary numbers of the $W^{th}$ bit to the $M^{th}$ bit.

Further, the processor 501 is further configured to obtain, from the binary numbers of the bit 0 to the bit M of the PIR, binary numbers of a $W'^{th}$ bit to a $(W-1)^{th}$ bit, where $0 \leq W' < W$; and obtain the second rate according to the binary numbers of the $W'^{th}$ bit to the $(W-1)^{th}$ bit.

Optionally, the processor 501 is further configured to obtain $Token_{max}$, where $Token_{max}=PIR*T_{max}$, $T_{max}$ represents a period corresponding to the PIR, and $T_{max} \geq L/K$; obtain a token difference, where the token difference$=Token_{max}-V_1*T_1*[T_{max}/T_1]$, and $V_1$ represents the first rate; and obtain the second period by using the token difference and the second rate.

According to the apparatus for maintaining tokens provided by this embodiment of the present invention, a peak information rate (PIR) of a network node can be obtained; a first period is set according to a minimum refresh period that hardware performance of the network node can support; the PIR is split into a first rate and a second rate; a second period is obtained according to $Token_{max}$ and the second rate; then the first number of added tokens corresponding to the first period is obtained according to the first rate, and the second number of added tokens corresponding to the second period is obtained according to the second rate; and tokens are added according to the first period and the first number of added tokens, and tokens are added according to the second period and the second number of added tokens. Compared with the prior art in which a longer period is selected for adding tokens, in this solution provided by the present invention, a PIR is split into multiple different rates and tokens are separately added according to each split rate, so that tokens that are added at a time according to each split rate are less than tokens that are added at a time according to the PIR, which avoids a burst excess of data that needs to be transmitted caused by an excess of tokens that are added at a time, thereby reducing a traffic peak and improving QoS; meanwhile, because a minimum PIR=1*precision of the PIR, $Token_{max}$ added in a period $T_{max}$ does not have a decimal part, and a storage resource occupied by an occupied storage capacity for storing an added token is reduced.

The embodiments in this specification are all described in a progressive manner, mutual reference may be made to the same or similar part of the embodiments, and each embodiment focuses on illustrating a difference from other embodiments. In particular, for the apparatus embodiment, because it is basically similar to the method embodiment, the apparatus embodiment is described simply, and for the relevant part, reference may be made to the part of the description of the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments may be performed. The storage medium may include a magnetic disk, an optical disc, a read-only memory (Read-Only Memory, ROM), a random access memory (Random Access Memory, RAM), or the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data in an IP network, comprising:
   obtaining, by a processor included in a network node, a peak information rate (PIR) of the network node, wherein the network node comprises a computer in the IP network;
   splitting, by the processor, the PIR into a first rate and a second rate, wherein a sum of the first rate and the second rate is equal to the PIR, wherein splitting the PIR into the first rate and the second rate comprises:
      obtaining L, N, and K, wherein $N=L/(K*T_1)$, L represents a minimum packet length, K represents precision of the PIR, and $T_1$ represents the first period,
      obtaining W by using N, wherein $N=2^w$, or $2^W$ is a minimum integer that is greater than N,
      determining binary numbers of a bit 0 to a bit M of the PLR, and obtaining binary numbers of a $W^{th}$ bit to an $M^{th}$ bit, and
      obtaining the first rate according to the binary numbers of the $W^{th}$ bit to the $M^{th}$ bit
   obtaining, by the processor, according to the first rate, a first number of tokens to be added to a first period;
   obtaining, by the processor, according to the second rate, a second number of tokens to be added to a second period;
   adding, by the processor, the first number of tokens to the first period;
   adding, by the processor, the second number of tokens to the second period; and
   transmitting, by a network interface included in the network node, data in the IP network based on the first period and the second period.

2. The method according to claim 1, further comprising:
   obtaining a minimum refresh period that hardware performance of the network node can support; and
   setting a value that is greater than or equal to the minimum refresh period to the first period.

3. The method according to claim 1, wherein the splitting the PIR into the first rate and the second rate further comprises:
   obtaining, from the binary numbers of the bit 0 to the bit M of the PIR, binary numbers of a $W'^{th}$ bit to a $(W-1)^{th}$ bit, wherein $0 \leq W'^{th} < W$; and
   obtaining the second rate according to the binary numbers of the $W'^{th}$ bit to the $(W-1)^{th}$ bit.

4. The method according to claim 1, further comprising:
   obtaining $Token_{max}$, wherein $Token_{max}=PIR*T_{max}$ $T_{max}$ represents a period corresponding to the PIR, and $T_{max} \geq L/K$;
   obtaining a token difference, wherein the token difference$=Token_{max}-V_1*T_1*[T_{max}/T_1]$, and $V_1$ represents the first rate; and obtaining the second period by using the token difference and the second rate.

5. An apparatus for transmitting data in an IP network, comprising:
- a processor;
- a network interface; and
- a memory storing a computer program that, when executed by the processor, causes the apparatus to perform the steps of:
  - obtaining a peak information rate (PIR) of a network node;
  - splitting the PIR into a first rate and a second rate, wherein a sum of the first rate and the second rate is equal to the PLR, wherein splitting the PIR into the first rate and the second rate comprises:
    - obtaining L, N, and K, wherein $N=L/(K*T_1)$, L represents a minimum packet length, K represents precision of the PIR, and $T_1$ represents the first period,
    - obtaining W by using N, wherein $N=2^w$, or $2^w$ is a minimum integer that is greater than N,
    - determining binary numbers of a bit 0 to a bit M of the PLR, and obtaining binary numbers of a $W^{th}$ bit to an $M^{th}$ bit, and
    - obtaining the first rate according to the binary numbers of the $W^{th}$ bit to the $M^{th}$ bit;
  - obtaining, according to the first rate, a first number of tokens to be added to a first period, and obtain, according to the second rate, a second number of tokens to be added to a second period; and
  - adding the first number of tokens to the first period, and add the second number of tokens to the second period;

wherein the network interface is configured to transmit data in the IP network based on the first period and the second period.

6. The apparatus according to claim 5, wherein executing the computer program by the processor further causes the apparatus to perform the steps of:
- obtaining a minimum refresh period that hardware performance of the network node can support; and
- setting a value that is greater than or equal to the minimum refresh period to the first period.

7. The apparatus according to claim 5, wherein splitting the PIR into the first rate and the second rate further comprises:
- obtaining, from the binary numbers of the bit 0 to the bit M of the PIR, binary numbers of a $W'^{th}$ bit to a $(W-1)^{th}$ bit, wherein $0 \leq W' < W$; and
- obtaining the second rate according to the binary numbers of the $W'^{th}$ bit to the $(W-1)^{th}$ bit.

8. The apparatus according to claim 5, wherein splitting the PIR into the first rate and the second rate further comprises:
- obtaining $Token_{max}$, wherein $Token_{max}=PIR*T_{max}$, $T_{max}$ represents a period corresponding to the PIR, and $T_{max} > L/K$;
- obtaining a token difference, wherein token difference$=Token_{max}-V_1*T_1*[T_{max}/T_1]$, and $V_1$ represents the first rate; and
- obtaining the second period by using the token difference and the second rate.

* * * * *

UNITED STATES PATENT AND TRADEMARK OFFICE
CERTIFICATE OF CORRECTION

PATENT NO. : 9,641,440 B2  
APPLICATION NO. : 14/523447  
DATED : May 2, 2017  
INVENTOR(S) : Zhonghua Li Page 1 of 1

It is certified that error appears in the above-identified patent and that said Letters Patent is hereby corrected as shown below:

In the Claims

Column 14, Line 32, "PLR" should read -- PIR --.

Signed and Sealed this
First Day of August, 2017

Joseph Matal
*Performing the Functions and Duties of the
Under Secretary of Commerce for Intellectual Property and
Director of the United States Patent and Trademark Office*